United States Patent
Le Bail et al.

(10) Patent No.: US 11,899,773 B2
(45) Date of Patent: Feb. 13, 2024

(54) SECURE AUTHENTICATION DEVICE USING LIGHT AND RADIO SIGNALS

(71) Applicant: BYSTAMP, Vannes (FR)

(72) Inventors: Yann Le Bail, Vannes (FR); Vincent Hue, Vannes (FR); Laurent Even, Vannes (FR); Thierry Maison, Vannes (FR)

(73) Assignee: BYSTAMP, Vannes (FR)

( * ) Notice: Subject to any disclaimer, the term of this patent is extended or adjusted under 35 U.S.C. 154(b) by 861 days.

(21) Appl. No.: 16/967,589

(22) PCT Filed: Feb. 4, 2019

(86) PCT No.: PCT/EP2019/052602
§ 371 (c)(1),
(2) Date: Aug. 5, 2020

(87) PCT Pub. No.: WO2019/154749
PCT Pub. Date: Aug. 15, 2019

(65) Prior Publication Data
US 2021/0157897 A1  May 27, 2021

(30) Foreign Application Priority Data

Feb. 6, 2018 (FR) ..................... 1850958

(51) Int. Cl.
*G06F 21/44* (2013.01)
*H04W 4/80* (2018.01)
(Continued)

(52) U.S. Cl.
CPC ............ *G06F 21/44* (2013.01); *H04L 9/3215* (2013.01); *H04L 12/189* (2013.01); *H04W 4/80* (2018.02);
(Continued)

(58) Field of Classification Search
CPC .... G06F 21/44; G06F 1/32; G06F 2221/2129; H04W 4/80; H04W 76/10; H04W 12/06;
(Continued)

(56) References Cited

U.S. PATENT DOCUMENTS 9,888,337 B1 * 2/2018 Zalewski ................ H04L 67/10
10,708,251 B2 * 7/2020 Steiner .................. H04L 9/3234
(Continued)

FOREIGN PATENT DOCUMENTS

CN  108369621 A  *  8/2018  ........... G06F 1/1684
EP  2610717 A1  7/2013
(Continued)

OTHER PUBLICATIONS

International Search Report and Written Opinion in Corresponding PCT Application No. PCT/EP2019/052602 dated Feb. 21, 2019. 11 pages.
(Continued)

*Primary Examiner* — Techane Gergiso
(74) *Attorney, Agent, or Firm* — Leason Ellis LLP (57) ABSTRACT

The invention relates to an authentication device intended to be used with an electronic device comprising a screen and a radio transceiver, the authentication device being characterised in that it comprises a light receiver, disposed on a face of the authentication device intended to be placed facing the screen, a radio transceiver and a memory comprising an encryption key, the authentication device being adapted to receive, via the light receiver, and decode an identification light signal emitted by the screen, the identification light signal encoding a message comprising identification information, broadcasting the identification information via its radio transceiver, receiving, via its radio transceiver, a request to establish a connection from the electronic device and establishing the connection, receiving, via the connec-
(Continued)

tion established, a message comprising information to be encrypted, encrypting said information using the encryption key and sending a message to the electronic device, the message comprising the encrypted information.

10 Claims, 5 Drawing Sheets

(51) Int. Cl.
    *H04W 76/10*     (2018.01)
    *H04L 9/32*     (2006.01)
    *H04L 12/18*     (2006.01)
    *G06F 1/32*     (2019.01)

(52) U.S. Cl.
    CPC ............... *H04W 76/10* (2018.02); *G06F 1/32* (2013.01); *G06F 2221/2129* (2013.01)

(58) Field of Classification Search
    CPC ...... H04L 9/3215; H04L 12/189; H04M 1/66; H04M 1/21
    See application file for complete search history.

(56) References Cited

U.S. PATENT DOCUMENTS

| | | | |
|---|---|---|---|
| 2013/0278552 A1* | 10/2013 | Kamin-Lyndgaard | G06F 3/04883 345/173 |
| 2014/0183269 A1* | 7/2014 | Glaser | G06K 19/07701 235/492 |
| 2016/0246396 A1* | 8/2016 | Dickinson | G06F 3/043 |

FOREIGN PATENT DOCUMENTS

| | | |
|---|---|---|
| EP | 2824899 A1 | 1/2015 |
| EP | 2846508 A1 | 3/2015 |
| WO | 2016108075 A1 | 7/2016 |

OTHER PUBLICATIONS

International Preliminary Report on Patentability in Corresponding PCT Application No. PCT/EP2019/052602 dated Aug. 11, 2020. 8 pages.

* cited by examiner

SECURE AUTHENTICATION DEVICE USING LIGHT AND RADIO SIGNALS

CROSS-REFERENCE TO RELATED PATENT APPLICATIONS

This application is a U.S. National Stage Application under 35 U.S.C. § 371 of International Patent Application No. PCT/EP2019/052602, filed Feb. 4, 2019, which claims the benefit of priority of French Patent Application number 1850958 filed Feb. 6, 2018, both of which are incorporated by reference in their entireties. The International Application was published on Aug. 15, 2019, as International Publication No. WO 2019/154749 A1.

The present invention relates to the field of authentication devices.

The international patent application PCT/EP2016/075235 filed on 20 Oct. 2016 discloses an authentication device intended to be used with an electronic device comprising a capacitive touchscreen and a receiver, the authentication device being characterised in that it comprises a plurality of pins disposed on the same face of the authentication device, at least two pins consisting of a conductive material, the other pins consisting of an insulating material, all the pins having an identical appearance, a means for detecting a pressure exerted on at least one pin and a means for emitting an authentication signal intended to be received by the receiver when a pressure is detected, the authentication signal being a sound signal.

Figure 1:
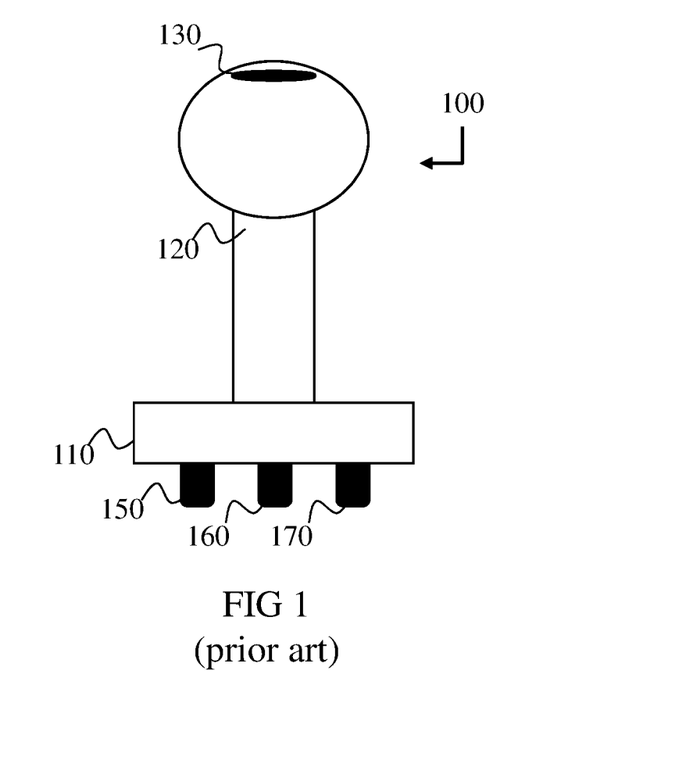
FIG. 1 illustrates an authentication device as disclosed in the international patent application PCT/EP2016/075235 filed on 20 Oct. 2016.

FIG. 1 illustrates schematically an example of such an authentication device 100 according to an embodiment disclosed in the previously cited patent application (the present FIG. 1 corresponding to FIG. 6 of the international patent application cited). According to this embodiment, the authentication device 100 is visually similar to a pad. The authentication device 100 comprises a sleeve 120 and a stamp 110. The authentication device 100 comprises a plurality of pins, or studs, disposed on a face of the stamp 110. FIG. 1 being a profile view of the authentication device 100, only three pins 150, 160 and 170 are depicted. The pins advantageously consist of a flexible material. This flexibility allows contact of the pins with the surface of a screen of an electronic device of the smartphone or tablet type without risking damaging the screen. At least two pins among the plurality of pins consist of an electrically conductive material (hereinafter "conductive"), the other pins consisting of an electrically insulating material.

The authentication device 100 comprises at least one means for detecting a pressure exerted on at least one of the pins. For example, a pin comprises within it a switch, activated when said pin is pressed against a surface, for example a screen of an electronic device. The pins may be mounted on a movable support inside the authentication device 100, with a return spring. A pressure on the pins can then trigger a switch connected to the movable support.

The functioning of the authentication device 100 depends in particular on a step of detecting a pressure on the pin comprising the switch. This requires a user of the authentication device 100 to press the latter against the surface of a touch screen of a smartphone for example. It has been found in use that a certain number of users have a certain apprehension in performing this action, fearing damaging the screen of their smartphone, for example aggravating an existing crack. This apprehension is completely unjustified in practice, since the flexible pins cannot damage the screen. It is nevertheless problematic for acceptance of the use of the authentication device 100.

It is therefore necessary to propose an authentication device that can overcome the drawbacks of the authentication device 100, while continuing to preserve simplicity of use similar to that of a conventional ink pad.

The present invention relates to an authentication device intended to be used with an electronic device comprising a screen and a radio transceiver, the authentication device being characterised in that it comprises:
 a light receiver, disposed on a face of the authentication device intended to be placed facing the screen,
 a radio transceiver,
 a memory comprising an encryption key,
the authentication device being adapted for:
 receiving, via the light receiver, and decoding a so-called identification light signal emitted by the screen, the so-called identification light signal encoding a message comprising identification information,
 broadcasting the identification information via its radio transceiver,
 receiving, via its radio transceiver, a request to establish a connection from the electronic device, and establishing the connection with the electronic device,
 receiving, via the connection established, a message comprising information to be encrypted,
 encrypting said information using the encryption key,
 sending a message to the electronic device, the message comprising the encrypted information.

Advantageously, and unlike the authentication device disclosed in the international patent application PCT/EP2016/075235, the activation of the present authentication device is done by means of the light receiver. The use of the light receiver thus makes it possible to remedy the apprehension of the users fearing to press an authentication device against the screen of their smartphone. This is because it is not necessary to exert any pressure of the authentication device against the screen or the smartphone in order to activate the authentication device. In addition, the use of the light receiver advantageously allows the transmission by the electronic device, by means of a light signal, of information for establishing a radio connection between the electronic device and the authentication device. In addition, unlike a switch, which may be actuated involuntarily, the use of a particular light signal for activating the authentication device makes this activation step more secure and less prone to involuntary activations. This may be particularly advantageous for an authentication device where the number of uses is limited, each involuntary activation otherwise reducing accordingly the service life of the authentication device. The establishment of a radio connection between the authentication device and the electronic device allows a bilateral exchange of data, and in particular the sending, by the electronic device, of data that can be encrypted by the authentication device. The encryption key therefore remains within the authentication device and is never transmitted to the electronic device.

According to a complementary embodiment of the invention, the so-called identification light signal encoding a message also comprising authentication information, the authentication device is adapted for, subsequently to the step of receiving the request for establishment of the connection, securing the establishment of the connection using the authentication information.

According to a complementary embodiment of the invention, the authentication device comprising a first operating mode, referred to as standby mode, and a second operating mode referred to as active mode, the standby mode being characterised by an energy consumption of the authentication device lower than that of the active mode, the authentication device is adapted for, prior to the reception of the identification light signal:

functioning in the first operating mode, referred to as standby mode, receiving, via the light receiver, and decoding the so-called activation light signal emitted by the screen, the so-called activation light signal encoding a message comprising activation information, determining the validity of the activation information received and, if the activation information is valid, switching into the second operating mode referred to as active mode.

According to a complementary embodiment of the invention, the authentication device comprises a flexible opaque skirt disposed around the light receiver, the skirt being adapted for, when the authentication device is in contact with the screen of the electronic device, allowing solely the capture by the light receiver of light emitted by the screen.

According to a complementary embodiment of the invention, the authentication device being intended to be used with an electronic device comprising a capacitive touch screen, the authentication device comprises a plurality of pins disposed on the face of the authentication device intended to be placed facing the screen, at least two pins consisting of a conductive material, the other pins consisting of an insulating material, all the pins having an identical appearance.

According to a complementary embodiment of the invention, the authentication device comprises a plurality of light receivers disposed on the face of the authentication device intended to be placed facing the screen, each light receiver being surrounded by a flexible opaque skirt.

According to a complementary embodiment of the invention, one and the same flexible opaque skirt can surround a plurality of light receivers.

According to a complementary embodiment of the invention, the memory is a secured element.

According to a complementary embodiment of the invention, the radio transceivers are in accordance with a Bluetooth standard.

The invention also relates to an authentication system, the system comprising:

an authentication device as described in the present document, an electronic device comprising a screen and a radio transceiver, the electronic device executing an authentication application and being adapted for:

emitting the so-called activation light signal, emitting the so-called identification light signal, detecting, via its radio transceiver, the broadcasting of the identification information by the authentication device, establishing, via its radio transceiver, a connection with the authentication device, sending to the authentication device, via the connection, a message comprising information to be encrypted, receiving, via the connection, a message comprising encrypted information.

The invention also relates to an authentication method, the method being executed by an electronic device comprising a screen and a radio transceiver, the method comprising the steps of:

emitting a so-called activation light signal, the so-called activation light signal encoding a message comprising activation information for an authentication device, emitting a so-called identification light signal, the so-called identification light signal encoding a message comprising identification information, detecting, via its radio transceiver, the broadcasting of the identification information by the authentication device, establishing, via its radio transceiver, a connection with the authentication device, transmitting to the authentication device, via the connection, information to be encrypted, receiving, via the connection, encrypted information.

The present invention also relates to a computer program that can be stored on a medium and/or downloaded from a communication network, in order to be read and executed by a processor, or implemented in a microcontroller, of an authentication device or of an electronic device. This computer program comprises instructions for implementing all or some of the steps of the authentication method described below according to any one of the variants thereof. The invention also relates to storage means comprising such a computer program.

The features of the invention mentioned above, as well as others, will emerge more clearly from the reading of the following description of an example embodiment, said description being made in relation to the accompanying drawings, among which.

Figure 2:
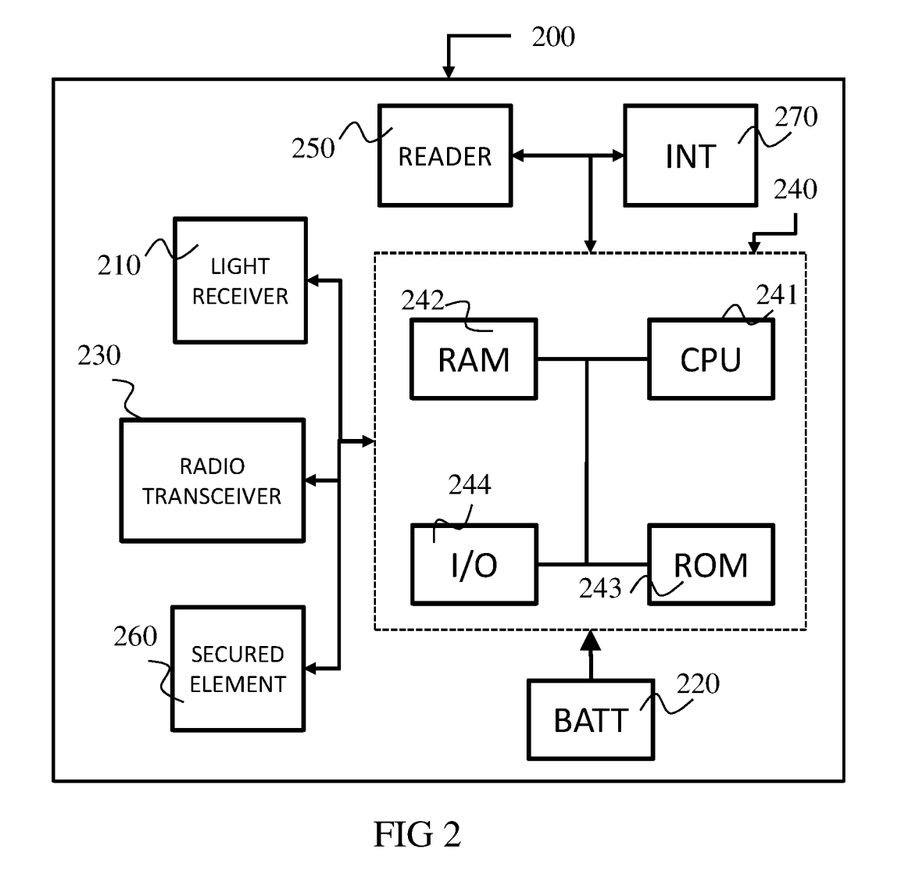
FIG. 2 illustrates schematically an example of hardware architecture of an authentication device according to an embodiment of the invention.

FIG. 2 illustrates schematically an example of hardware architecture of an authentication device 200 according to an embodiment of the invention. The authentication device 200 has a form roughly similar to the authentication device illustrated in FIG. 1. In this embodiment of the invention, the authentication device 200 comprises a microcontroller 240. The microcontroller 240 is an electronic device that comprises a programmable data processing unit (central processing unit) CPU 241, a random access memory RAM 242, a memory, or storage module, of the non-volatile type ROM 243 and one or more input/output interfaces I/O 244. The interfaces I/O 244 may comprise analogue to digital or digital to analogue signal converters. According to alternative embodiments of the invention, the functionalities of the microcontroller 240 are fulfilled by a programmable logic circuit (field-programmable gate array—FPGA), a digital signal processor (DSP), an application-specific integrated circuit (ASIC) or any other equivalent device. The authentication device 200 comprises an electrical supply module BATT 220, for example a battery or a cell. The authentication device 200 comprises a light receiver 210. This light receiver may be of the photodiode or photoresistor type. The light receiver 210 is situated under the authentication device 200, on the face of the authentication device 200 intended to come into contact with a screen of an electronic device such as a smartphone. The light receiver 210 is adapted to capture a light signal and convert it into an electrical signal that is transmitted to the microcontroller 240 or to the processor CPU 241. The light receiver 210 can thus decode a light signal modulated in frequency, phase and/or amplitude—or any other known modulation technique—allowing unidirectional communication to the authentication device 200. The authentication device 200 may comprise a plurality of light receivers 210. The authentication device 200 comprises a radio transceiver 230. The radio transceiver 230 is typically of the Bluetooth or Bluetooth Low Energy (BLE) type. According to alternative embodiments of the invention, the radio transceiver 230 is in accordance with a Wi-Fi, NFC (near field communication) or any other radio communication standard. The radio transceiver 230 is possibly integrated in the microcontroller 240. The radio transceiver 230 is adapted to establish a radio connection with an electronic device comprising a transceiver of the same type. The authentication device 200 and said electronic device can then exchange messages comprising information, or data. Advantageously, the transmission power of the radio transceiver 230 is reduced to a minimum, the purpose of the electronic device being to be in contact with the authentication device 200 when the authentication device 200 is used. This makes it possible to reduce possible interferences and to preserve the confidentiality of the exchanges. According to an embodiment of the invention, the authentication device 200 comprises a secured element 260. A secured element (SE) is a tamper-proof hardware component capable of containing and/or processing confidential data. Possibly, the secured element 260 comprises a secured processor, tamper-proof storage and execution memory. An encryption key can typically be recorded in the tamper-proof storage. The secured element can then encrypt, by means of the encryption key, any data or information supplied to it without it being possible to access the encryption key at any time. Advantageously, the encryption key is a so-called "private key" for establishing a so-called "asymmetric" encryption. A certificate and/or an associated so-called "public" encryption key may be recorded in association with the encryption key in the secured element 260. Alternatively, an encryption key may be recorded in the ROM memory 243 of the microcontroller 240.

Depending on the embodiment of the invention, the authentication device 200 may comprise a fingerprint reader LECT 250 or a switch 270. The functioning described below of the authentication device 200 may thus be dependent on the presence of a predetermined print on the fingerprint reader 250 or the prior activation of the switch 270.

The authentication device 200 is, like the authentication device in FIG. 1, at least partially covered with a conductive material so that the authentication device can function with a touchscreen of an electronic device.

The authentication device 200 may comprise a flexible opaque skirt disposed around the light receiver 210. The skirt is adapted so as, when the authentication device 200 is in contact with a screen of an electronic device, to allow solely the capture by the light receiver of light emitted by the screen. The skirt, for example formed from rubber, makes it possible to isolate the light receiver 210 lightwise from any light signal other than the one emitted by the screen against which the authentication device 200 is in contact. In the case where a light signal is present on the screen of the electronic device only on the area of the screen facing the light receiver 210, the skirt then makes it possible to conceal this light signal, only the light receiver 210 having visibility thereof, thus preserving the confidentiality of the light signal emitted by the screen. If the authentication device 200 comprises a plurality of light receivers 210, one and the same skirt may surround all the light receivers, or each light receiver may be surrounded by one skirt. Thus, when the authentication device 200 comprises a plurality of light receivers disposed on the face of the authentication device 200 intended to be placed facing the screen, each light receiver 210 being surrounded by a flexible opaque skirt, this skirt, being common to all the light receivers 210 or individual. It is possible to group together certain light receivers 210 in order to surround them with the same skirt. The skirt possibly consists of a conductive material allowing activation of a touchscreen of an electronic device.

Depending on the embodiment of the invention, the authentication device 200 may comprise a plurality of pins disposed on the face of the authentication device 200 intended to be placed facing the screen of an electronic device, at least two pins being formed from a conductive material, the other pins consisting of an insulating material, all the pins having an identical appearance. These pins are similar to those described in the international patent application previously cited. The presence of the pins, some of which are conductive, allows activation of a touchscreen of an electronic device. The detection, by an electronic device, of the presence of the conductive pins can make it possible to start the steps of an authentication method, as described below in FIGS. 5 and 6. The electronic device can also detect a pattern formed by the conductive pins and to deduce therefrom a relative positioning of the light receiver or receivers 210 of the authentication device 200. The electronic device can then activate only an area facing a light receiver in order to emit a light signal rather than the whole of the surface of the screen. This allows a simultaneous use of a plurality of light receivers, each area of the screen facing a light receiver being able to emit a different light signal, and preservation of confidentiality.

According to one embodiment of the invention, the authentication device comprises a first operating mode, referred to as standby mode, and a second operating mode referred to as active mode, the standby mode being characterised by a total energy consumption of the authentication device lower than that of the active mode.

Possibly, the microcontroller 240 and/or the processor CPU 241 can function in a low consumption mode, referred to as standby. In this standby mode, the microcontroller 240 and/or the processor CPU 241 consume very little energy and do not perform any operation. Conversely, the microcontroller 240 and/or the processor CPU 241 can also function in a so-called active mode, wherein they perform operations and, compared with standby mode, consume more energy. The other electronic components of the authentication device 200 may also have a so-called standby operating mode and a so-called active operating mode. The so-called standby operating mode of a component is characterised by an energy consumption of said component lower than the energy consumption of the same component in the active mode, or even zero. The microcontroller 240 and/or the processor CPU 241 can control the switching between the standby mode and the active mode of the various components of the authentication device 200. Thus, according to one embodiment of the invention, in the standby mode, the microcontroller 241 is in low consumption mode, the light receiver 241 is active and all the other elements of the authentication device are either in low consumption mode if such exists, or deactivated in order to reduce the total electricity consumption of the authentication device 200. Thus the authentication device 200 can be activated by the reception of a light signal, possibly particular, as described below. This light signal is then said to be an activation signal. The authentication device 200 can switch into the active mode on reception of the activation signal. The authentication device 200 can re-switch into the standby mode once a certain period of time has passed or at the end of an authentication method as described below.

Figure 3:
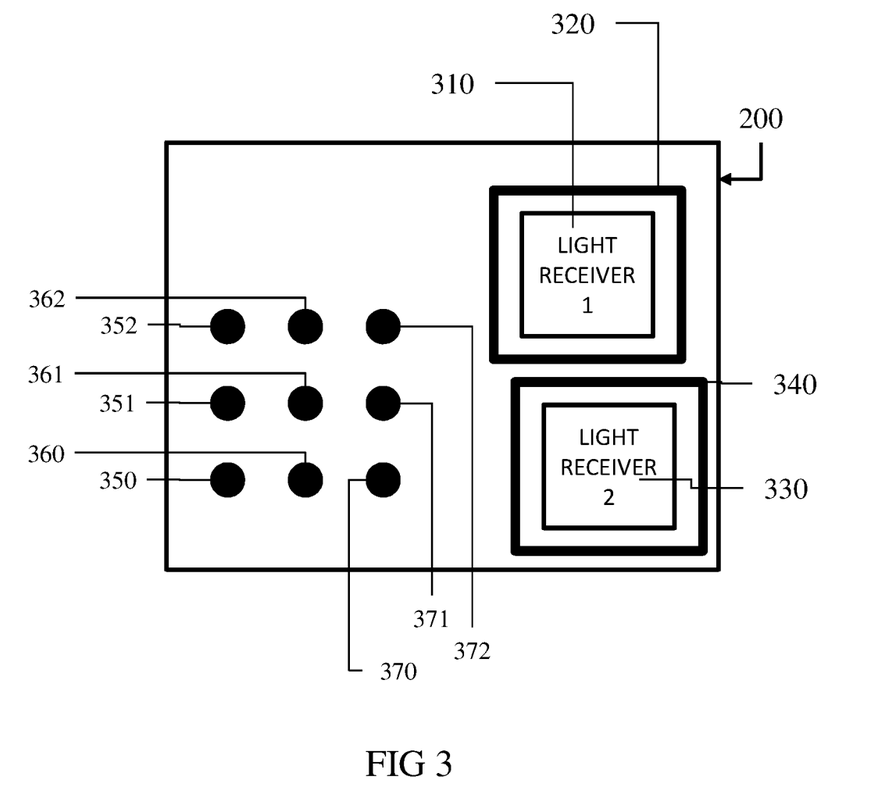
FIG. 3 is a view from below of the authentication device according to an embodiment of the invention.

FIG. 3 is a view from below of the authentication device 200 according to one embodiment of the invention. The authentication device 200 comprises here nine pines 350, 351, 352, 360, 361, 362, 370, 371 and 372, similar to the pins of the authentication device disclosed in the international patent application previously cited. These pins, at least the conductive pins, allow activation of a touchscreen of an electronic device such as a smartphone. Two light receivers 310 and 330 are depicted. Each light receiver 310 and 330 is surrounded by a skirt, respectively 320 and 340. The detection of a pattern formed by at least two conductive pins on the screen, or more precisely the location of this pattern on the screen, makes it possible to situate the location of the two light receivers facing the screen. The location of the light receivers on the face of the authentication device 200 is then associated with a predetermined pattern of the pins, the recognition of the pattern by an electronic device and the location of the pattern on the screen making it possible to deduce therefrom the location of the light receivers.

Advantageously, the use of a plurality of light receivers reduces the risks of erroneous activation of the authentication device 200. This is because an unwanted light signal will be received equally by each light receiver whereas the activation signal may be different for each light receiver. This also makes it possible to increase the available bandwidth, each light receiver being able to receive data simultaneously.

Figure 4:
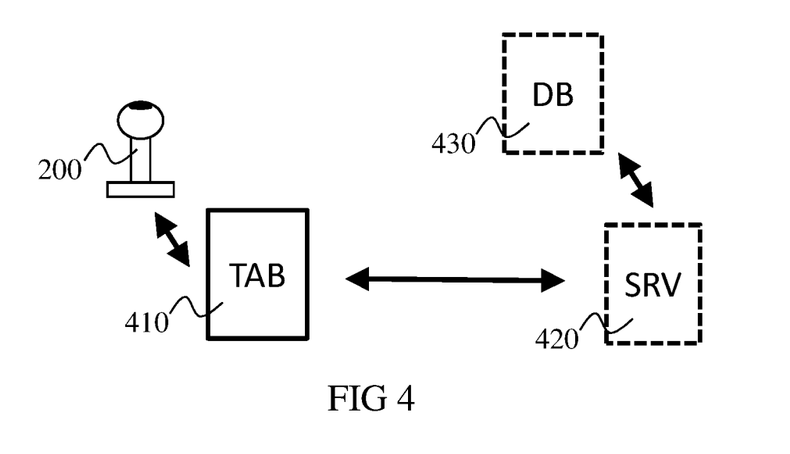
FIG. 4 illustrates schematically an authentication system according to an embodiment of the invention.

FIG. 4 illustrates schematically an authentication system according to one embodiment of the invention. The authentication system comprises an authentication device 200, an electronic device 410 and possibly a server 420 and a database 430. The electronic device 410 comprises a screen and a radio transceiver compatible with the transceiver of the authentication device 200. The screen is possibly of the touch type. The screen is possibly of the capacitive type. The electronic device may be a smartphone, a digital tablet, a portable computer or any other electronic device. The electronic device 200 is adapted for executing a computer program (or application) comprising instructions for implementing the authentication method described below. The computer program may be recorded in a memory of the electronic device 410 or downloaded on demand by the electronic device 410, for example from the server 420. The server 420 and/or the database 430 may comprise a memory wherein a match between a pattern formed by pins of an authentication device 200 and a position of the light receivers of said authentication device 200 is recorded. The memory of the server 420 and/or of the database 430 may also comprise a list of certificates or public keys associated with authentication devices 200, each authentication device 200 being associated with a unique identification number.

Figure 5:
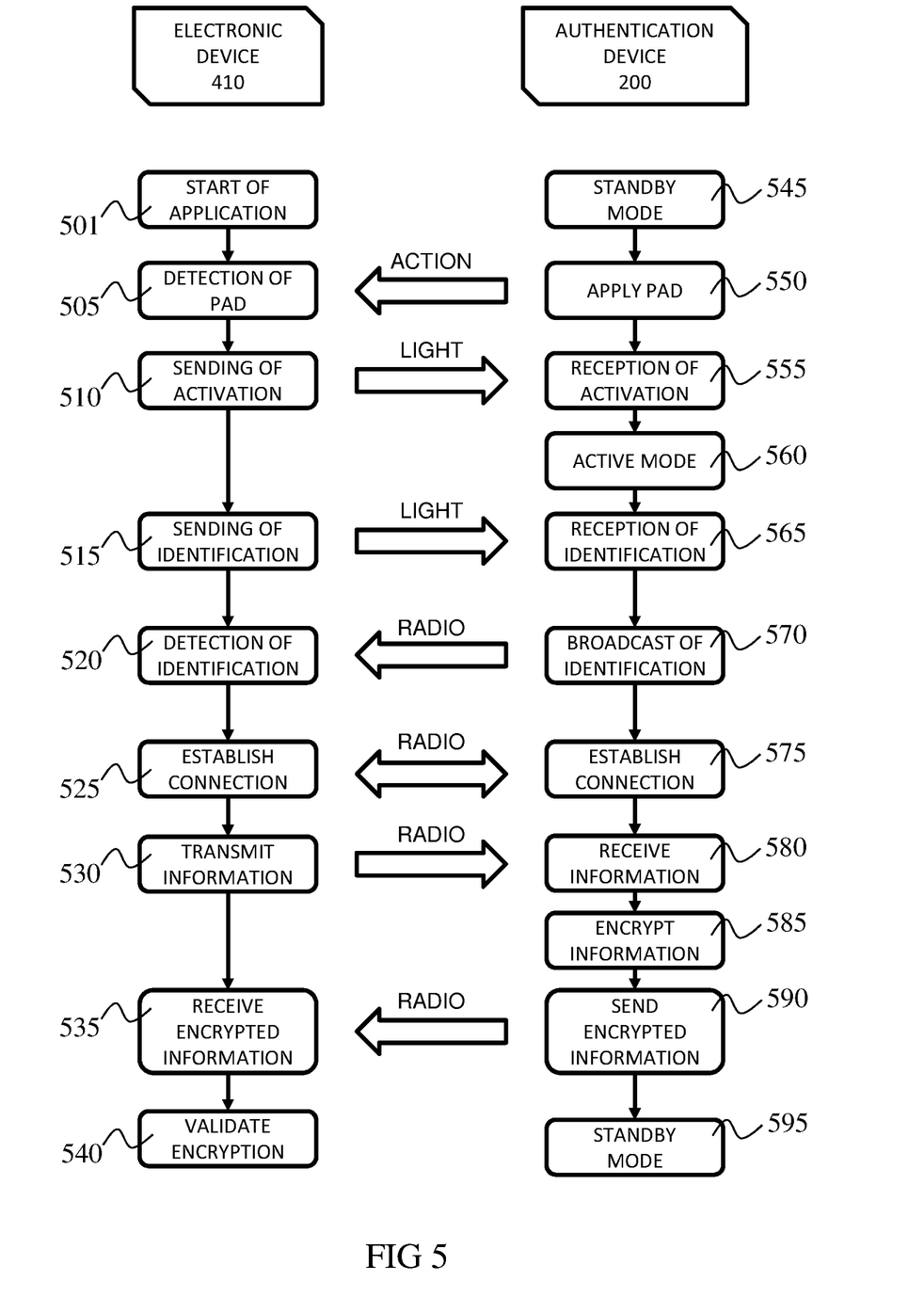
FIG. 5 is a flow chart of an authentication method according to an embodiment of the invention.

FIG. 5 is a flow chart of an authentication method according to one embodiment of the invention. According to this embodiment, the authentication device 200 comprises a plurality of pins, at least two being conductive, and a light receiver 210, as illustrated in FIG. 3. The method is implemented by a system such as the one described in FIG. 4, the system comprising at least the authentication device 200 and the electronic device 410.

In a first step 501, a user launches (starts) an authentication application on an electronic device 410. The application then presents an interface on the screen of the electronic device 410 inviting the user, or possibly another user possessing the authentication device 200, to "stamp" the screen, that is to say to put the authentication device 200 in contact with the screen of the electronic device 410. By default, the authentication device 200 is in the so-called standby mode (step 545).

If a user puts the authentication device 200 in contact with the screen (step 550), then, in a step 505, the electronic device 410 detects the presence of the authentication device by means of the conductive pins. Possibly, the electronic device 410 determines a predetermined pattern formed by the at least two conductive pins. The electronic device 410 can seek, in an internal memory or by interrogating the server 420 and/or the database 430, a position of the light receiver on the base of the authentication device 200, the position or positions being associated with said pattern. The position is determined relative to the position of the pattern.

The electronic device 410 then passes to step 510, triggering the sending of a so-called activation light signal by the screen. If the electronic device 410 has previously determined the location of the light receiver of the authentication device 200, then possibly the light emission is activated only on the area of the screen facing the light receiver, and on a surface adapted to the size of the light receiver. If the light receiver is surrounded by a skirt, then the light signal emitted can be captured only by the light receiver, thus preserving confidentiality. The so-called activation light signal encodes a message comprising activation information. The activation light signal is displayed, possibly repeated in a loop, for a period of around a few seconds. The activation information is predetermined information. Possibly, the activation information is predetermined and associates, with the authentication device 200, the electronic device 410 finding the activation information associated with the authentication device 200 applied by means of the recognition of the pattern formed by the pins. Possibly, in the case of plurality of light receivers, different activation information is associated with each light receiver of one and the same authentication device.

In a step 555, the authentication device 200 receives, via the light receiver, and decodes the so-called activation light signal emitted by the screen. Encoding information in the activation signal enables the authentication device 200 to make a distinction between a stray light signal and a light signal intended to activate it. If the authentication device 200 determines that the light signal received does indeed correspond to an activation light signal, then, in a step 560, the authentication device 200 switches into the so-called active operating mode. The authentication device 200 can then in particular activate the radio transceiver thereof. In other words, the authentication device 200 determines the validity of the activation information received and, if the activation information is valid, then the authentication device switches (or goes) into the so-called active operating mode. The predetermined activation information is previously recorded in a memory of the authentication device, for example during production or during a phase of initialisation of the authentication device 200. The authentication device 200 determines the validity of the activation signal by comparing the received value of the activation information with that recorded in its memory.

According to an embodiment of the invention, the step 555 comprises three substeps:

the authentication device 200 being in the standby mode, the light receiver 211 remains active and comprises an electronic circuit adapted for detecting a light signal meeting certain characteristics. Thus the electronic circuit of the light receiver 210 can be adapted to detect a light signal of a certain minimum duration, minimum light intensity and/or frequency (or any other physical characteristic for characterising a light signal), said light signal being converted into an electrical signal at the output of the light receiver 210 for possibly transmission of this electrical signal to the microcontroller 240 and/or the processor 241, when such a light signal is detected by the light receiver 210, the light receiver 210 is adapted for activating the microcontroller 240 and/or the processor 241, the latter then switching into the active mode, the microcontroller 240 and/or the processor 241 being in the active mode, the microcontroller 240 and/or the processor 241 can then analyse the electrical signal corresponding to the light signal transmitted by the light receiver 210; the microcontroller 240 and/or the processor 241 can in particular decode the signal and check whether the signal received does indeed correspond to an activation signal.

According to one embodiment of the invention, after having sent the activation light signal for a predetermined length of time, the electronic device 410 then passes to the step 515 and emits a so-called identification light signal. The so-called identification light signal encodes a message comprising identification information. Possibly, the identification signal also encodes authentication information. In other words, after having emitted the activation signal, the electronic device 410 next emits an identification signal. Afterwards, or at the same time, the electronic device 410 listens out, via the radio transceiver thereof, for devices emitting a signal. In other words, in a Bluetooth context, the electronic device 410 seeks visible Bluetooth devices.

According to a complementary embodiment of the invention, the message comprising the identification information, and possibly the authentication information, comprises another item of authentication information. This other item of authentication information may correspond for example to a PIN (Personal Identification Number) code entered on the electronic device 410 during a previous step by a user of the electronic device 410.

According to an alternative embodiment of the invention, the steps 501 and 515 are combined in a single step, the electronic device 410 emitting a light signal, possibly a plurality of times, comprising, in a first part, a light signal corresponding to the activation light signal and, in a second part, a light signal corresponding to the identification signal. The authentication device 200 then uses the first part of the light signal in order to be activated (steps 550 and 560) and then the second part for the steps 565 and subsequent.

It should be noted that, according to the embodiment of the invention, the light receiver 210, or certain parts such as the electronic circuit converting the light signal into an electrical signal, may be integrated in the microcontroller 240 and/or the processor 241. In this embodiment of the invention, some parts of the microcontroller 240 and/or the processor 241 may then be in the standby operating mode whereas others are in the so-called active operating mode. Some parts of the microcontroller 240 and/or the processor 241, typically functioning in the active mode, can then allow the switching of the microcontroller 240 and/or the processor 241 between the standby mode and the active mode.

The authentication device 200, in the step 565, receives, via the light receiver, and decodes the so-called identification light signal emitted by the electronic device 410. The authentication device 200 thus finds the identification information and, if it is present, the authentication information.

If another item of authentication information is included in the message, that is to say encoded in the so-called identification light signal, then the authentication device 200 can check whether this other item of authentication information, typically a PIN code, corresponds to a predetermined item of authentication information recorded in a memory of the authentication device 200. According to this embodiment, if the PIN code does correspond, the following steps are performed. If the PIN code does not correspond, or is absent, the authentication device 200 cannot perform the following steps and re-switches into standby mode.

In a following step 570, the authentication device 200 activates the broadcasting of the identification information by the radio transceiver thereof. In other words, if the transceiver of the authentication device 200 is a Bluetooth transceiver, the authentication device 200 broadcasts a message comprising the identification information received during the step 565. Possibly, if authentication information has been received, the connection to the Bluetooth network will require the provision of this authentication information in order to establish a connection. In other words, the identification information is used in order to name—identify—the Bluetooth network, the authentication information is used as a password for establishing a connection with the authentication device 200.

In a step 520, the electronic device 410 detects the authentication device 200 by means of its broadcasting of the identification information. In other words, in a Bluetooth context, the electronic device 410 recognises the authentication device 200 by means of the identification information included in the message broadcast by the authentication device 200, this Bluetooth name being the identification information. If the authentication device 200 is not detected by the electronic device 410, then the electronic device stops the detection method of the Bluetooth electronic device and possibly the emission of any light signal.

In a following step 525, the electronic device 410 can then ask to establish a radio connection with the authentication device 200. If authentication information has been sent, then the electronic device 410 uses this information to authenticate itself. The identification information and, possibly, the authentication information having been transmitted by the light signal, the presence of a skirt around the light receiver on the authentication device 200 makes it possible to guarantee that only this authentication device 200 can receive this information. Thus only this authentication device 200 can establish a Bluetooth network with the identification information as its name Another adjacent authentication device cannot capture the light signal.

In a simultaneous step 575, the authentication device 200 receives the connection establishment request from the electronic device. The connection is either established automatically, or the authentication device 200 asks the electronic device 410 for the transmission, by radio, of the authentication information. Since the authentication information is known to the authentication device 200 and to the electronic device 410, that is to say shared, any authentication mechanism using shared data can advantageously be used. If the authentication fails and/or without any connection establishment request, the authentication device 200 can re-switch into the so-called standby operating mode.

The connection being established, the electronic device 410 can, in a step 530, transmit information or data to be encrypted to the authentication device 200 via this radio connection. It should be noted that, depending on the technologies used, the radio connection, for example of the Bluetooth type, allows a data transmission bit rate from the electronic device to the authentication device greater than the unidirectional connection allowed by the emission of the light signal. This information may comprise a unique identifier of the electronic device and/or of the application and/or random information.

In a step 580, the authentication device 200 receives the information or data sent by the electronic device 410 during the step 530.

In a following step 585, the authentication device 200 determines which are the data to be encrypted. The authentication device 200 encrypts these data to be encrypted using the encryption key possibly recorded in a secured element or in a memory. Random or predetermined information can be added to the information to be encrypted before the encryption.

In a following step 590, the authentication device 200 sends a message to the electronic device 410 comprising the encrypted data.

According to the embodiment of the invention, the authentication device 200 can next await other data to be encrypted, repeating the steps 580, 585 and 590, or, in a step 595, switch into the so-called standby operating mode. The situation, for the authentication device 200, becomes that of the step 545 again (except if the authentication device 200 comprises a counter of the number of uses, the latter having been incremented/decremented according to the implementation during one of the steps 565 to 590, preferentially the step 585).

According to a complementary embodiment of the invention, following the step 590, the authentication device 200 can establish a new radio connection with a predetermined electronic device and send a message comprising information on the encryption operation performed during the step 585. In other words, the authentication device 200 can, following the execution of the method previously described, perform a so-called reporting step, connecting to a predetermined electronic device. Possibly, the authentication device 200 then, in an initialisation step, asks to be associated with a predetermined electronic device adapted for receiving said report sent by the authentication device 200. According to one embodiment of the invention, the authentication device 200 can be associated with a Bluetooth USB (Universal Serial Bus) key (or "Bluetooth dongle") adapted to be connected to, for example, a computer or an electronic cash register. This advantageously makes it possible to store, on an electronic device other than the electronic device 410, information on the encryption operations (or signature operations according to the embodiment of the invention) performed by the authentication device 200.

At the same time, the electronic device receives, during the step 535, the encrypted data. The electronic device 410 can perform a step 540 of checking the encryption performed. The electronic device 410 can for example find, in a memory or at the server 420, a certificate or a public key associated with the encryption key used by the authentication device 200. If the encryption performed by the authentication device 200 is validated, the electronic device 410 keeps the encrypted data, otherwise these are ignored and possibly the application displays an error message.

According to an alternative embodiment of the invention, the method is triggered by the activation of a switch, for example similar to the one described in the international patent application previously cited. The steps 510 and 555 corresponding to the emission and to the reception/validation of the activation light signal are then not performed.

Figure 6:
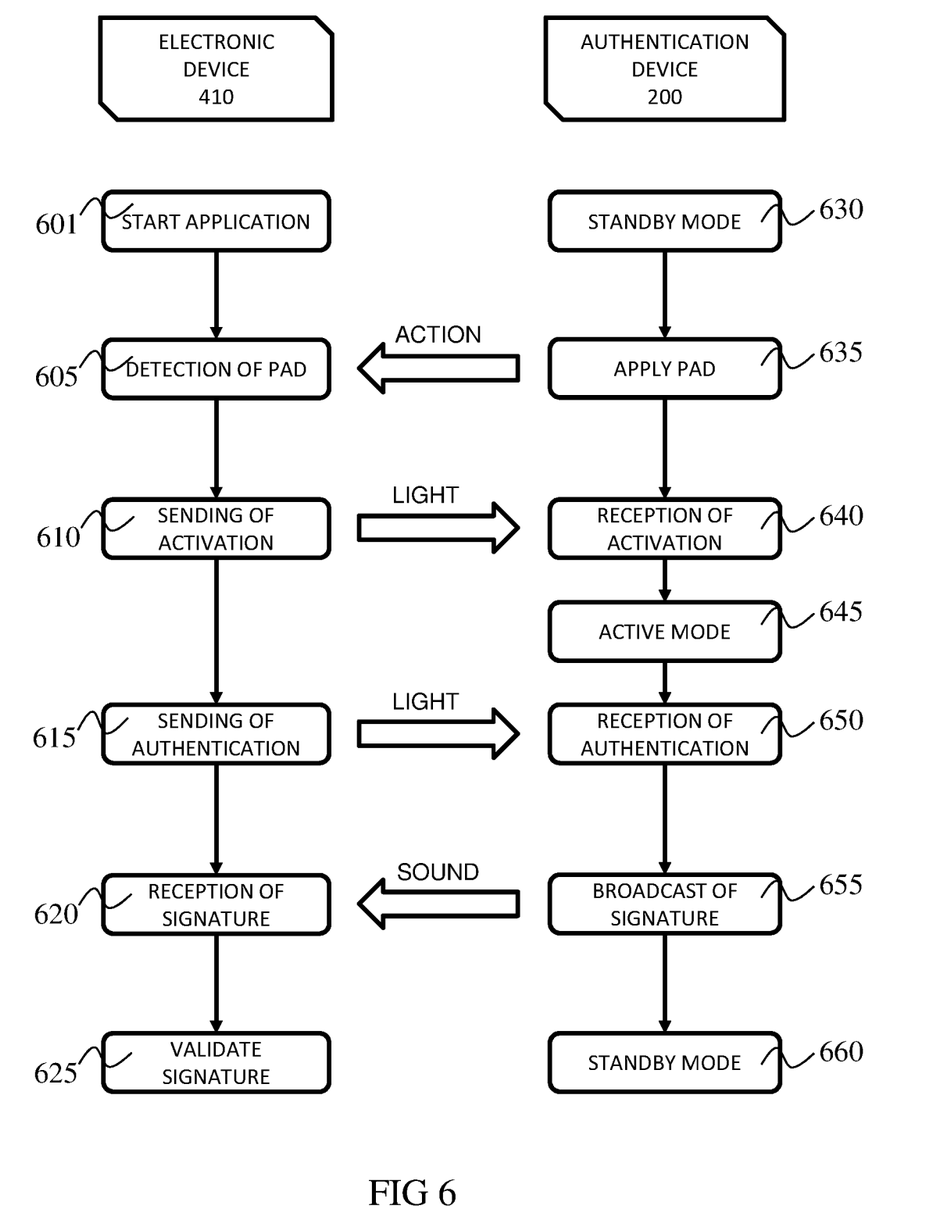
FIG. 6 is a flow diagram of an authentication method according to an alternative embodiment of the invention.

FIG. 6 is a flow chart of an authentication method according to an alternative embodiment of the invention. In this alternative embodiment, the authentication device 200 does not comprise a radio transceiver or secured element. The authentication device 200 on the other hand comprises a sound emitter. The sound emitter is typically an electroacoustic transducer, for example a piezoelectric crystal. The sound emitter advantageously emits in the ultrasound range. The design of the authentication device 200 is therefore facilitated and it consumes less energy. In this embodiment, the authentication device 200 can communicate unidirectionally to an electronic device provided that the latter comprises a microphone. The electronic device typically being a smartphone or a digital tablet, this is indeed the case in the great majority of cases. Likewise, the electronic device can communicate unidirectionally to the authentication device 200 by means of a light signal emitted by a screen, in a similar fashion to what was described previously. The authentication device 200 can thus comprise a skirt around the light receiver thereof. The authentication method is simplified compared with the one described in FIG. 5.

The authentication device 200, as before, is typically in a so-called standby operating mode, that is to say with reduced energy consumption, at the start of the method (step 630).

The step 601, performed by an electronic device, is identical to the step 501 of FIG. 5.

In a step 635, similar to the step 550 of FIG. 5, a user applies the authentication device 200 against the screen of the electronic device.

The latter, in a step 605, detects the presence of the authentication device 200 by means of the conductive pins, as in the step 505 of FIG. 5.

The electronic device, in a step 601, similar to the step 501 of FIG. 5, emits an activation light signal.

In a similar manner to the steps 555 and 560 of FIG. 5, the authentication device 200 detects and validates the activation information and, if valid, switches into a so-called active operating mode.

Following the emission of the activation signal for a predetermined time, the electronic device, in a step 615, emits an authentication light signal. This authentication light signal encodes a message comprising authentication information. This authentication information is possibly random of the nonce type in order to avoid the risk of replay attack.

In a step 650, the authentication device 200 receives and decodes the authentication light signal. Next, in a step 655, the authentication device 200 emits, via its sound emitter, an acoustic signal encoding so-called signature information. This so-called signature information comprises the authentication information received during the step 650 and a unique identifier of the authentication device 200.

In a step 620, the electronic device, having previously activated its microphone, for example following the step 615, receives the acoustic signal and decodes the signature. The electronic device checks that the authentication information of the signature received does indeed correspond to the one sent during the step 615. If such is not the case, the method ends and the application displays an error message. If the authentication information does correspond, the electronic device can check, with for example a server 420 as described in FIG. 4, the validity of the unique identifier of the authentication device 200.

According to an alternative embodiment of the invention, the invention relates to an authentication device 200 not consisting of a conductive material. This is because some usages of the authentication device 200, in particular if the user is wearing gloves, do not make it possible to use the authentication device 200 with a touchscreen. In this case, the method described above is adapted as follows:
- as soon as the application is started up (step 501), the electronic device 410 emits a predetermined light signal,
- the authentication device 200, initially in the standby mode, is placed by the user facing the screen of the electronic device 410 and receives and decodes the predetermined light signal; if this predetermined light signal corresponds to a predetermined light signal recorded in a memory of the authentication device 200, then the authentication device 200 switches to the active mode,
- the authentication device 200 can emit an acknowledgement signal, for example a predetermined signal; this predetermined signal may be an audible signal if the authentication device 200 comprises a loudspeaker or a radio signal, for example Bluetooth if the authentication device 200 comprises a radio transceiver;
- the electronic device receives the acknowledgement signal,
- the electronic device can then resume the previously described method as from step 515 ("emission of the identification").

This alternative embodiment of the invention also advantageously makes it possible to dispense with pins under the authentication device 200, which simplifies the design and the production of the authentication device 200. In addition, the screen of the electronic device 200 does not require to be a touchscreen, which broadens the compatibility of the authentication device 200.

According to the embodiment of the invention, the authentication device 200 may comprise a diode or any other retrieval device, such as a screen, for indicating to a user of the authentication device 200 the correct execution of the method or on the other hand a failure of the method.

According to the embodiment of the invention, once the radio connection is established during the step (525, 575), the electronic device 410 can be adapted in order to transmit predetermined configuration and/or information-reading instructions to the authentication device 200.

The invention claimed is:

1. An authentication device is used with an electronic device comprising a capacitive touch screen and a radio transceiver, wherein the authentication device comprises:
    a light receiver, disposed on a face of the authentication device is placed facing the capacitive touch screen,
    the radio transceiver,
    a memory comprising an encryption key,
the authentication device further comprising:
    a plurality of pins disposed on the face of the authentication device placed facing the capacitive touch screen, at least two pins of the plurality of pins consisting of a conductive material and constituting a predetermined pattern associated with a first item of activation information, the remaining other pins of the plurality of pins consisting of an insulating material, with all the pins of the plurality of pins having an identical appearance,
    a first operating mode, referred to as a standby mode, and a second operating mode referred to as an active mode, the standby mode being characterised by an energy consumption of the authentication device lower than an energy consumption of the active mode,
    the authentication device being adapted for:
        functioning in the first operating mode wherein the authentication device is configured to operate in the standby mode for:
            receiving, via the light receiver an activation light signal emitted by the capacitive touch screen,
            decoding, via the light receiver, the received activation light signal,
            encoding, via the light receiver, the activation light signal into a first message comprising a second item of activation information,
            determining a validity of the second item of activation information, and
            if the second item of activation information is equal to the first item of activation information, switching from the first operating mode referred to as the standby mode into the second operating mode referred to as the active mode,
    wherein the authentication device is configured to operate in the second operating mode referred to as the active mode for:
        receiving, via the light receiver, an identification light signal emitted by the capacitive touch screen,
        decoding, via the light receiver, the received identification light signal,
        encoding, via the light receiver, the identification light signal into a second message comprising identification information,
        broadcasting the second message via the radio transceiver,
        receiving, via the radio transceiver, a request to establish a connection from the electronic device, and
        establishing the connection with the electronic device,
        receiving, via the established connection the first message comprising the second item of activation information to be encrypted,
        encrypting said second item of activation information using the encryption key, and
        sending the first message to the electronic device, the first message comprising the encrypted second item of activation information.

2. The authentication device according to claim 1, the activation light signal encoding the first message comprising authentication information, the authentication device being adapted for, subsequent to the receiving of the request for establishment of the connection:
    securing the establishment of the connection using the authentication information.

3. The authentication device according to claim 1, the authentication device further comprising:
    a flexible opaque skirt disposed around the light receiver, the flexible opaque skirt being adapted for, when the authentication device is in contact with the capacitive touch screen, allowing solely a capture by the light receiver of light of the capacitive touch screen.

4. The authentication device according to claim 3, the authentication device comprising a plurality of light receivers disposed on the face of the authentication device and placed facing the capacitive touch screen, each light receiver of the plurality of light receivers being surrounded by the flexible opaque skirt.

5. The authentication device according to claim 4, the same flexible opaque skirt being able to surround the plurality of light receivers.

6. The authentication device according to claim 1, wherein the memory is a secured element.

7. The authentication device according to claim 1, wherein the radio transceiver is in accordance with a Bluetooth standard.

8. An authentication system, the system comprising:
    the authentication device according to claim 1, the electronic device comprising the capacitive touch screen and the radio transceiver, the electronic device executing an authentication application and being adapted for:

emitting the activation light signal, detecting, via the radio transceiver, the broadcasting of the first message by the authentication device, establishing, via the radio transceiver, a connection with the authentication device, sending to the authentication device, via the connection, the first message comprising the second item of activation information to be encrypted, receiving, via the connection, the first message comprising the encrypted second item of activation information.

9. An authentication method, the method being executed by an electronic device comprising a screen and a radio transceiver, the electronic device comprising circuitry causing the electronic device to perform:

emitting an activation light signal, the activation light signal encoding a first message comprising activation information for an authentication device, emitting an identification light signal, the identification light signal encoding a second message comprising identification information, detecting, via the radio transceiver, the broadcasting of the identification information by the authentication device, establishing, via the radio transceiver, a connection with the authentication device, transmitting to the authentication device, via the connection, information to be encrypted, receiving, via the connection, encrypted information.

10. A non-transitory storage medium that stores a computer program comprising instructions for implementing, by an apparatus, the method according to claim 9, wherein said program is executed by a processor of said apparatus.

\* \* \* \* \*